United States Patent [19]

Utsumi et al.

[11] Patent Number: 4,781,963

[45] Date of Patent: Nov. 1, 1988

[54] MAGNETIC RECORDING MEDIUM

[75] Inventors: Shigeo Utsumi, Yokohama; Shigeyuki Watanabe, Kawasaki, both of Japan

[73] Assignee: Diafoil Company, Limited, Tokyo, Japan

[21] Appl. No.: 38,898

[22] Filed: Apr. 16, 1987

[30] Foreign Application Priority Data

Apr. 16, 1986 [JP] Japan ................................ 61-87683

[51] Int. Cl.$^4$ .............................................. G11B 5/704
[52] U.S. Cl. .................................... 428/141; 427/128; 427/129; 427/131; 427/132; 428/143; 428/147; 428/148; 428/149; 428/323; 428/327; 428/328; 428/329; 428/330; 428/331; 428/480; 428/694; 428/900
[58] Field of Search ............... 428/328, 329, 695, 694, 428/480, 900, 327, 323, 141, 143, 149, 910, 331, 147, 330, 148; 360/134–136; 252/62.54; 427/128, 131, 129, 132

[56] References Cited

U.S. PATENT DOCUMENTS

| | | | |
|---|---|---|---|
| 4,316,927 | 2/1982 | Kimura | 428/900 |
| 4,318,957 | 3/1982 | Videc | 428/900 |
| 4,411,958 | 10/1983 | Sato | 428/457 |
| 4,439,479 | 3/1984 | Kanai | 428/328 |
| 4,590,119 | 5/1986 | Kawakami et al. | 428/900 |
| 4,654,249 | 3/1987 | Barbey | 428/694 |
| 4,670,319 | 6/1987 | Katoh | 428/900 |
| 4,693,932 | 9/1987 | Kuze | 428/694 |

FOREIGN PATENT DOCUMENTS

| | | |
|---|---|---|
| 139551 | 10/1981 | Japan . |
| 185345 | 11/1982 | Japan . |
| 189163 | 10/1984 | Japan . |
| 202254 | 11/1984 | Japan . |
| 229314 | 12/1984 | Japan . |
| 221354 | 12/1984 | Japan . |

*Primary Examiner*—Ellis P. Robinson
*Attorney, Agent, or Firm*—Oblon, Fisher, Spivak, McClelland & Maier

[57] ABSTRACT

Disclosed herein is a magnetic recording medium comprising a biaxially oriented polyester film having an extremely low surface roughness and containing fine particles and specific higher aliphatic carboxylic acids and/or derivatives thereof, and a magnetic layer formed on one side of the polyester film.

The magnetic recording medium exhibits a stable travelling nature even when it is not provided with a back coat layer, and is usable as a high-quality and high-density magnetic recording medium.

12 Claims, No Drawings

MAGNETIC RECORDING MEDIUM

BACKGROUND OF THE INVENTION

The present invention relates to a magnetic recording medium which comprises a biaxially oriented polyester film having an extremely low surface roughness and a magnetic layer formed on one side thereof, and which exhibits a high quality, a high density and an excellent travelling property even when it is not provided with a back coat layer.

More particularly, the present invention relates to a magnetic recording medium comprising a biaxially oriented polyester film which contains very fine particles and specific higher aliphatic carboxylic acids and/or derivatives thereof, and which exhibits specific average surface roughness, coefficient of friction and coefficient of friction during repeated travellings, and a magnetic layer formed on one side of the polyester film. The magnetic recording medium according to the present invention is excellent in electromagnetic characteristics, travelling property, wear resistance and scuff resistance even if it is not provided with a back coat layer, and can be produced at a low cost.

High-quality and high-density magnetic recording media, above all, video tapes have recently been increasingly developed. Specifically, as ½-inch video tapes for home use, tapes having a high S/N ratio which are called a super high grade or extra high grade type tapes have been chiefly used. In this type of video tapes, a film having an extremely small surface roughness is used as the base film in order to enhance the S/N ratio, and a back coat layer is generally provided on the opposite side of the magnetic layer, because stable travelling cannot be maintained by merely providing a magnetic layer on the base film.

However, formation of both of a magnetic layer and a back coat layer on the sides of a base film in the process of producing a magnetic tape requires an extra equipment and complicated steps which may lower the yield, resulting in a rise in the cost. Therefore, development of a magnetic recording medium has been strongly demanded, which has a base film having an extremely low surface roughness and is provided with fundamental properties of a magnetic tape such as stable travelling property, scuff resistance, prevention of producing white powder, etc. during the travel without a back coat layer.

As a result of researches to provide a magnetic recording medium which exhibits the above-described excellent properties without a back coat layer, the present inventors have found that a biaxially oriented polyester film which contains very fine particles and specific higher aliphatic carboxylic acids and/or derivatives thereof, and is obtained by an appropriate method, if necessary, can improve the slipping property in spite of an extremely low surface roughness thereof, and that a magnetic recording medium obtained by using this film as the base material exhibits a good electromagnetic converting property and stable travelling property, wear resistance and scuff resistance without a back coat layer. The present invention has been achieved on the basis of these findings.

SUMMARY OF THE INVENTION

In the first aspect of the invention, there is provided a magnetic recording medium comprising a biaxially oriented polyester film showing the average surface roughness Ra of 0.005 to 0.013 μm, the static coefficient ($\mu_s$) of film-film friction of not more than 0.28, the dynamic coefficient ($\mu_d$) of film-film friction of not more than 0.28, and the maximum coefficient of friction of not more than 0.30 during 50-time repeated travelling, said biaxially oriented polyester film containing, with respect to 100 parts by weight of polyester, (A) 0.001 to 1.0 part by weight of inner particles having an average diameter of 0.1 to 1.5 μm and/or inactive additional particles having an average diameter of 0.1 to 1.0 μm and (B) 0.005 to 2 parts by weight of an organic lubricant which comprises a mixture of higher aliphatic monocarboxylic acids having respectively different carbon numbers of not less than 18 and/or a mixture of derivatives thereof having respectively different carbon numbers of not less than 18, contains not less than 10 wt % of higher aliphatic monocarboxylic acid(s) in which the acid moiety has not less than 34 carbon atoms and/or derivative(s) thereof having not less than 34 carbon atoms, and has a melting point of 80° to 200° C., said higher aliphatic monocarboxylic acids and derivatives thereof being represented by formula (1):

wherein $R_1$ represents an alkyl group or an unsaturated hydrocarbon group having not less than 10 carbon atoms, $R_2$ represents an alkyl group having not less than one carbon atom or an unsaturated hydrocarbon group having not less than 2 carbon atoms, $R_3$ represents a hydrogen atom, an alkyl group or an unsaturated hydrocarbon group having not less than 2 carbon atoms, and $R_4$ represents a hydrogen atom, a metal, an alkyl group having not less than one carbon atom or an unsaturated hydrocarbon group having not less than two carbon atoms, the total number of carbon atoms in $R_1$, $R_2$, $R_3$ and $R_4$ being not less than 16; and a magnetic layer provided on one side of said polyester film.

In the second aspect of the invention, there is provided a process for producing a magnetic recording medium comprising the steps of mixing a polyester polymer containing 0.001 to 1.0 part by weight of inner particles having an average diameter of 0.1 to 1.5 μm and/or inactive additional particles having an average diameter of 0.1 to 1.0 μm with respect to 100 parts by weight of polyester, with 0.005 to 2 parts by weight, with respect to 100 parts by weight of polyester, an organic lubricant which comprises a mixture of higher aliphatic monocarboxylic acids having respectively different carbon numbers of not less than 18 and/or a mixture of derivatives thereof having respectively different carbon numbers of not less than 18, contains not less than 10 wt % of higher aliphatic monocarboxylic acid(s) having not less than 34 carbon atoms and/or derivative(s) thereof in which the acid moiety has not less than 34 carbon atoms and has a melting point of 80° to 200° C., said higher aliphatic monocarboxylic acids and derivatives thereof being represented by formula (1):

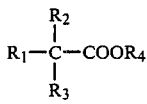

(1)

wherein $R_1$ represents an alkyl group or an unsaturated hydrocarbon group having not less than 10 carbon atoms, $R_2$ represents an alkyl group or an unsaturated hydrocarbon group having not less than 2 carbon atoms, $R_3$ represents a hydrogen atom, an alkyl group having not less than one carbon atom, or an unsaturated hydrocarbon group having not less than 2 carbon atoms, and $R_4$ represents a hydrogen atom, a metal, an alkyl group having not less than one carbon atom or an unsaturated hydrocarbon group having not less than two carbon atoms, the total number of carbon atoms in $R_1$, $R_2$, $R_3$ and $R_4$ being not less than 16;

melt extruding the mixture at a temperature of 250° to 310° C. into an amorphous film;

stretching the amorphous film in the machine direction by 2.0 to 8.0 times at a temperature of 75° to 140° C. so that the double refractive index after stretching is 0.030 to 0.130;

stretching the thus obtained film in the transverse direction by 2.0 to 5.0 times at a temperature of 90° to 150° C.;

heat setting the thus biaxially stretched film at a temperature of 200° to 240° C. for 1 to 60 seconds, thereby obtaining a biaxially oriented polyester film showing the average surface roughness Ra of 0.005 to 0.013 μm, the static coefficient friction (μs) of film-film of not more than 0.28, the dynamic coefficient friction (μd) of film-film of not more than 0.28, and the maximum coefficient friction of not more than 0.30 during 50-time repeated travelling; and forming a magnetic layer on one side of said biaxially oriented polyester film.

DETAILED DESCRIPTION OF THE INVENTION

The present invention provides a magnetic recording medium comprising a biaxially oriented polyester film showing the average surface roughness Ra of 0.005 to 0.013 μm, the static coefficient ($\mu_s$) of film-film friction of not more than 0.28, the dynamic coefficient ($\mu_d$) of film-film friction of not more than 0.28, and the maximum coefficient of friction of not more than 0.30 during 50-time repeated travelling, said biaxially oriented polyester film containing, with respect to 100 parts by weight of polyester, (A) 0.001 to 1.0 part by weight of inner particles having an average diameter of 0.1 to 1.5 μm and/or inactive additional particles having an average diameter of 0.1 to 1.0 μm and (B) 0.005 to 2 parts by weight of an organic lubricant which comprises a mixture of higher aliphatic monocarboxylic acids having respectively different carbon numbers of not less than 18 and/or a mixture of derivatives thereof having respectively different carbon numbers of not less than 18, contains not less than 10 wt % of higher aliphatic monocarboxylic acid(s) having not less than 34 carbon atoms and/or derivative(s) thereof in which the acid moiety has not less than 34 carbon atoms, and has a melting point of 80° to 200° C., said higher aliphatic monocarboxylic acids and derivatives thereof being represented by formula (1):

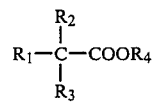

(1)

wherein $R_1$ represents an alkyl group or an unsaturated hydrocarbon group having not less than 10 carbon atoms, $R_2$ represents an alkyl group or an unsaturated hydrocarbon group having not less than 2 carbon atoms, $R_3$ represents a hydrogen atom, an alkyl group having not less than one carbon atom, or an unsaturated hydrocarbon group having not less than 2 carbon atoms, and $R_4$ represents a hydrogen atom, a metal, an alkyl group having not less than one carbon atom or an unsaturated hydrocarbon group having not less than two carbon atoms, the total number of carbon atoms in $R_1$, $R_2$, $R_3$ and $R_4$ being not less than 16; and a magnetic layer provided on one side of said polyester film.

"Polyester" used in the present invention mainly means polyethylene terephthalate and polyethylene-2,6-naphthalate. polyester in the present invention further includes polybutylene terephthalate, polybutylene dibenzoate, polyesters obtained from bisphenol A and a terephthalic acid or an isophthalic acid, and polyesters obtained by copolymerization of each monomer of the above-described polyesters and ethylene glycol, propylene glycol, butanediol, xylene glycol, bisphenol A, diethylene glycol, polyethylene glycol, polytetramethylene glycol, polypropylene glycol, adipic acid, sebatic acid, phthalic acid, isophthalic acid, 2,6-naphthalene dicarboxylic acid, p-oxyethoxy benzoic acid, glycolic acid, etc. It also includes polypropylene terephthalate, polypentylene bibenzoate, a polyester of 3,3-bis(p-oxyphenyl)pentane and terephthalic acid, a polyester of 2,2-bis(3-methyloxyphenyl)propane and terephthalic acid, a polyester of 2,2-bis(p-oxyphenyl)pentane and isophthalic acid or terephthalic acid, a copolymerized polyester of ethylene terephthalate or ethylene isophthalate, and a copolymerized polyester obtained by using sebacate, adipate, 1,4-cyclohexanedimethanol, etc. as a copolymerization component. The polyester in the present invention is, of course, not restricted to the above-described examples.

The inner particles used in the present invention are particles produced from at least one compound which are generally added at the time of synthesis of a polyester, such as a calcium compound, a magnesium compound and a lithium compound and a monomer or an oligomer which constitutes a polyester. The inner particles used in the present invention may contain a phosphorus element and/or other metal components, for example, zinc, cobalt, antimony, germanium and titanium in a range in which the effects of the present invention are not impaired. The average particle diameter of the inner particles is 0.1 to 1.5 μm.

The inactive additional particles used in the present invention are, for example, inorganic salts, oxides or organic salts of the elements of groups I, II, III and IV in the periodic table and are chemically inactive. They are exemplified by kaolin, talk, magnesium carbonate, calcium carbonate, barium carbonate, calcium sulfate, barium sulfate, lithium phosphate, calcium phosphate, magnesium phosphate, aluminum oxide, silicon oxide, titanium oxide, lithium fluoride, Ca, Ba, Zn and Mn salts of oxalic acid and terephthalic acid, and the particles of carbon blacks. The inactive additional particles are also not restricted to the above examples. The inactive additional particles may be spherical, bulky, or flaky, and there is no special restriction in the hardness, specific gravity, color or the like. The average particle diameter of the inactive additional particles is 0.1 to 1.0 $\mu$m, preferably 0.3 to 1.0 $\mu$m. If it is smaller than 0.1 $\mu$m, the slipping property of the polyester film is insufficient, while if it exceeds 1.0 $\mu$m, the flatness of the polyester film is impaired.

Coarse particles are removed from the inactive additional particles to adjust the particle size by various known grinding and/or classifying methods such as air classification, natural sedimentation or centrifugal sedimentation performed after making the particles into an ethylene glycol slurry or a water slurry, and grinding by a sand mill.

A polyester film according to the present invention must contain at least one of the inner particles and the inactive additional particles. The amount of the particles is 0.001 to 1 part by weight, preferably 0.01 to 0.5 part by weight with respect to 100 parts by weight of polyester in both the case where the polyester film contains only one of the inner particles and the inactive additional particles or both particles. It is preferable that 0.1 to 1.0 part by weight of small particles having an average particle diameter of 0.1 to 0.6 $\mu$m and 0 to 0.1 part by weight of large particles having an average diameter of 0.4 to 1.0 $\mu$m are contained with respect to 100 parts by weight of polyester. Although the inner particles may be used as the small particles while using the inactive additional particles as the large particles, it is preferable that both the small particles and the large particles are the additional particles. In the present invention, the slipping property set forth below contribute mainly in lowering the coefficient of friction of a polyester film, but the shapes of the particles, distribution of the particles in the polyester film and the particle diameter of the particles are also the important factors which affect the coefficient friction after the film is made into a magnetic tape. From this viewpoint, titanium oxide, synthetic calcium carbonate, zeolite, silica, etc. are preferable as the small particles. As the large particles, calcium carbonate, calcium oxalate, lithium fluoride and, among all, calcium carbonate is preferable.

If the content of the inner particles and/or inactive additional particles is less than 0.001 part by weight with respect to 100 parts by weight of polyester, the coefficient of film - film and film - metal friction becomes large, and the slipping property is impaired. On the other hand, if the content exceeds 1 part by weight with respect to 100 parts by weight of polyester, many coarse particles are produced and the surface roughness increases, thereby disadvantageously impairing the flatness of the surface of the polyester film.

The higher aliphatic monocarboxylic acids and derivatives thereof, both having not less than 18 carbon atoms used in the present invention as an organic lubricant are represented by the following formula (1):

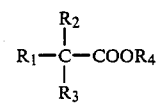

$$R_1-\underset{R_3}{\overset{R_2}{C}}-COOR_4 \quad (1)$$

wherein $R_1$ represents an alkyl group or an unsaturated hydrocarbon group having not less than 10, preferably 16~44 carbon atoms, $R_2$ represents an alkyl group having not less than one, preferably 1~3 carbon atoms or an unsaturated hydrocarbon group having not less than 2, preferably 2~3 carbon atoms, $R_3$ represents a hydrogen atom, an alkyl group having not less than one, preferably 1~3 carbon atoms, or an unsaturated hydrocarbon group having not less than 2, preferably 2~3 carbon atoms, and $R_4$ represents a hydrogen atom, a metal, an alkyl group having not less than one, preferably 1~17 carbon atom or an unsaturated hydrocarbon group having not less than two, preferably 2~17 carbon atoms, the total number of carbon atoms in $R_1$, $R_2$, $R_3$ and $R_4$ being not less than 16, preferably 32~50.

As a metal for $R_4$, an alkaline metal or an alkaline earth metal such as lithium, sodium, potassium, barium, magnesium, calcium and strontium is used. Above all, sodium is preferable from the point of view of the thermal stability of the polyester.

If the higher aliphatic monocarboxylic acid having less than 18 carbon atoms is used, the bleedout thereof to the surface of the polyester film impairs the adhesion between the magnetic layer and the polyester film. In order to prevent the bleedout and enhance the adhesion between the magnetic layer and the polyester film, it is preferable that not less than 10 wt %, preferably, not less than 20 wt % of higher aliphatic monocarboxylic acid(s) and/or derivative(s) thereof, both having not less than 34 carbon atoms are contained in the organic lubricant. It is more preferable that the organic lubricant used in the present invention substantially consist of higher aliphatic monocarboxylic acid(s) and/or derivative(s) thereof both having not less than 34 carbon atoms.

The melting point of the organic lubricant is 80° to 200° C., preferably 100° to 200° C.

If the melting point is under 80° C., the thermal stability of the polyester is disadvantageously impaired. On the other hand, if the melting point is more than 200° C., the dispersion thereof into the polyester is insufficient, thereby unfavorably impairing the flatness of the surface of the polyester film.

The content of the organic lubricant is 0.005 to 2 parts by weight, preferably 0.01 to 1 part by weight, and more preferably 0.05 to 0.5 part by weight with respect to 100 parts by weight of polyester. If the content is less than 0.005 parts by weight, the slipping property is not sufficient, while if it exceeds 2 parts by weight, the bleedout thereof to the surface of the film occurs unfavorably so much as togreatly reduce the adhesion between the magnetic layer and the polyester film.

The higher aliphatic monocarboxylic acid(s) and derivative(s) thereof (salts and esters) may be used alone or in combination. The sufficient result for the object of the present invention is obtained by using the higher aliphatic monocarboxylic acid(s) or derivative(s) thereof alone. Therefore, in the case of combination use, the higher aliphatic monocarboxylic acid(s) and derivative(s) thereof may be mixed in any ratio.

In order to enhance the slipping property of the polyester film, which is the base for a magnetic recording material, natural higher aliphatic monocarboxylic acids and metal salts or esters thereof have been used (Japanese Patent Application Laying-Open (KOKAI) Nos. 59-221354 (1984) and 60-82326 (1985)). However, those natural compounds are expensive and have a constant number of carbon atoms. Furthermore, no natural higher aliphatic monocarboxylic acid having 34 or more carbon atoms is known. In contrast, in the case of the synthetic higher aliphatic monocarboxylic acid(s) and derivative(s) thereof used in the present invention, it is possible to synthesize those having not less than 34 carbon atoms. The slipping property of the polyester film can be enhanced by using a small amount of the organic lubricant which contains not less than 10 wt %, preferably not less than 20 wt %, and more preferably almost 100% of higher aliphatic monocarboxylic acid(s) and/or derivative(s) thereof having not less than 34 carbon atoms. It is preferable that the content of higher aliphatic monocarboxylic acid(s) and/or derivative(s) thereof having not less than 50 carbon atoms is less than 3%. If it is 3% or more, the flatness of the surface of the polyester film is unfavorably impaired.

The average surface roughness (Ra) of the polyester film according to the present invention, measured by a method set forth later, is 0.005 to 0.013 μm, preferably 0.008 to 0.013 μm, and more preferably 0.008 to 0.011 μm. If the average surface roughness (Ra) is less than 0.005 μm, the polyester film is too flat to show a stable travelling property without a back coat layer. On the other hand, if Ra exceeds 0.013 μm, the flatness is too low to be used as a super high grade or extra high grade magnetic recording medium.

The static and dynamic coefficients of film - film friction of the polyester film in the present invention, measured by a method set forth later, are not more than 0.28, preferably 0.15 to 0.25. If either the static coefficient friction or dynamic coefficient friction exceeds 0.28, it is impossible to obtain a stable travelling property without a back coat layer.

It is also necessary that the maximum coefficient of friction of the polyester film according to the present invention during 50-time repeated travellings is not more than 0.30. If it exceeds 0.30, it is difficult to use a magnetic recording medium having such polyester film as the base repeatedly.

The polyester film according to the present invention is a biaxially oriented film. If it is not a biaxially oriented film, it is difficult to obtain the polyester film having the surface roughness and the coefficient friction in the above-described ranges, and the uniformity in thickness, the rigidity and the dimensional stability of the polyester film are unsuitably impaired.

Biaxial orientation is carried out in a known method, and it is preferable that biaxial orientation is carried out so that the average refractive index ($\bar{n}$), the degree of surface orientation (Δp) and the double refractive index (Δn) of the biaxially oriented film satisfy the following relationships (2), (3) and (4), respectively, by limiting the double refractive index after stretching in the machine direction to a low value or relaxing the stretched film in the transverse direction at the time of heat setting, thereby improving the travelling property, the wear resistance and the scuff resistance.

$$1.600 \leq \bar{n} \leq 1.606 \quad (2)$$

$$\Delta p \leq 1.43 \bar{n} - 2.128 \quad (3)$$

$$\Delta n \leq 20 \times 10^{-3} \quad (4)$$

In the film which shows the physical values satisfying the above-mentioned relationship, it is also preferable that the number (A) of pair of protuberances and depression, which is derived from the protuberances and has a major axis of at least 2 μm, per one mm² of the surface of the film satisfies the following relationship (5).

$$5 \leq A \text{ tm} \quad (5)$$

It has been confirmed that the travelling property of the polyester film according to the present invention depends upon the intrinsic viscosity of the polyester, and the intrinsic viscosity $[n]_F$ of the film is not more than 0.65, preferably not more than 0.62, and more preferably not more than 0.60.

A polyester film having the above-described characteristics is produced by a known method, for example, in the following way.

Higher aliphatic carboxylic acid(s) and/or derivative(s) thereof are dry blended with a polyester containing a predetermined amount of inner particles and/or inactive additional particles by means of an extruder or the like. The thus-obtained master batch is mixed with a polyester and/or another master batch, if necessary, and the mixture is dried by an ordinary method, melt extruded at a temperature of 250° to 310° C., and rapidly cooled by an electrostatic contact method or the like, thereby forming an amorphous film.

The amorphous film is stretched in the machine direction by 2.0 to 8.0 times at 75° to 140° C. so that the double refractive index is 0.030 to 0.130. The stretched film is then further stretched in the transverse direction by 2.0 to 5.0 times at 90° to 150° C., and thereafter is heat set at 200° to 240° C. for 1 to 60 seconds to obtain a biaxially oriented film. It is preferable that the biaxially stretched film is subjected to relaxation in the transverse direction by 0 to 10 % at the time of heat setting.

So long as the average refractive index ($\bar{n}$), the degree of surface orientation (Δp) and the double refractive index (Δn) of the polyester film satisfy the relationships (2), (3) and (4), respectively, the film may be restretched in the machine and/or the transverse direction, re-heat-set or subjected to relaxation in the transverse direction at the time of heat setting.

A magnetic recording medium according to the present invention is obtained by providing a magnetic layer on one side of the thus-obtained biaxially oriented film. The magnetic layer is formed by dispersing a powdery magnetic material such as $\gamma\text{-Fe}_2\text{O}_3$, $\gamma\text{-Fe}_2\text{O}_3$ doped with Co, $CrO_2$ or a ferromagnetic alloy in an organic binder, applying the dispersion to one side of the biaxially oriented polyester film, magnetically orientating and calendering, according to the conventional method.

A magnetic recording medium according to the present invention obtained in this manner has a polyester film of 5 to 27 μm, preferably 9 to 25 μm thick, and a magnetic layer of 1 to 10 μm, preferably 2 to 8 μm thick, and it exhibits such excellent electromagnetic characteristics, stable travelling property, wear resistance and scuff resistance as to be required for a high-quality and high-density magnetic recording medium without a back coat layer. Since the steps for forming a back coat layer is unnecessary, it can be produced industrially advantageously.

The present invention will be explained in more detail while referring to the following non-limitative examples.

The evaluation of the characteristics of a polyester film and a magnetic recording medium according to the present invention was made in the following manner.

(1) Average surface roughness Ra

The surface roughness was obtained by the method described in JIS B0601-1976 by using a surface roughness measuring machine model SE-3F produced by Kosaka Kenkyusho, Ltd. The radius of the tip of the contact needle was 2 μm, and the load was 30 mg, the cut-off value was 0.08 mm, and the measuring length was 2.5 mm. The surface roughness was measured at 12 points, and an average of measurements at 10 points was obtained with the maximum and minimum values removed.

(2) Static and dynamic coefficients of film - film friction

The coefficients of film - film friction were measured in accordance with ASTM-D-1894B-63 by using a slip tester.

(3) The maximum coefficient of friction during repeated travelling

The maximum coefficient of friction was measured by the method described in Japanese Patent Application Laying-Open (KOKAI) No. 61-47235 (1986). A polyester film which had been slit to a narrow width was subjected to contacting with a fixed metal roll plated with hard chromium at a contact angle of 135° ($\theta$). While applying a load of 53 g ($T_2$) to one end of the polyester film, the polyester film was subjected to travelling at a rate of 1 m/sec, and the resistance $T_1$ of the other end was measured. The dynamic coefficient friction was obtained from the following formula.

$$\mu_d = \frac{1}{\theta} \ln \frac{T_1}{T_2}$$

During 50-time reciprocating travellings, $\mu_d$ for each time was obtained and the maximum $\mu_d$ was determined as $\mu_{max}$.

(4) Evaluation of wear resistance

A polyester film which had been slit to a width of 1.0 mm was subjected to travelling over a length of 200 m, and the amount of abrasion dust which had adhered to a fixed pin (6 mm in diameter, finished with hard chromium plating) was visually evaluated on the basis of the following criteria. The travelling speed of the polyester film was 10 m/min, the initial tension was 300 gr, and the angle of contact of the polyester film to the pin was 135°.

⊚ No adhesion of abrasion dust
○ Hardly any adhesion of abrasion dust
Δ Slight adhesion of abrasion dust
x Much amount of adhesion of abrasion dust (5) Evaluation of the adhesive strength between a magnetic layer and a polyester film A double-sided adhesive tape was applied on a stainless steel sheet of 1 mm thick, and the magnetic layer of a video type was applied on the other side of the adhesive tape. The polyester base film was then peeled off the magnetic layer at an angle of 180°, and the resistance at that time was measured by means of Tensilon. The peeling speed was 1 m/min and the adhesive strength was represented by a relative ratio with respect to a reference tape.

(6) Travelling property and scuff resistance of a magnetic tape

A magnetic recording tapes recorded with signals of 7,000 Hz was mounted on a video tape recorder and was subjected to travelling at a speed of 10 cm/sec, while repeating the starting and stopping operations. The test was continued until the travelling time reached 100 hours, while measuring the power output. Among the tapes which had travelled smoothly without entangling to the guide rollers during that time, tapes with the drop in power outputs of less than 1.0 dB were judged to have a "very good travelling property", those with the drop in power outputs less than 2.0 dB were judged to have a "good travelling property", and those with the drop in power outputs of 2.0 dB or more were judged to have a "bad travelling property". The film surface after 100-hour travelling was observed by a microscope, and the scuff resistance was evaluated on the basis of the following criteria.
1 Hardly any scuff
2 Intermediate
3 Full of scuffs (7) Electromagnetic converting property When a magnetic recording medium was subjected to playback, the medium showing a strong output signal and a flat signal wave was judged to be "good", while the medium showing a weak output signal or a deformed signal wave was judged to be "bad".

(8) Intrinsic viscosity $[n]_F$ 1 g of polyester was dissolved in 100 ml of a mixed solvent of phenol/tetrachloroethane in a weight ratio of 50:50, and the intrinsic viscosity was measured at 30° C.

(9) Double refractive index after stretching in the machine direction

The retardation was measured by a polarizing microscope produced by Carl-Zeiss Stiftung, and the double refractive index ($\Delta n$) was obtained from the following formula.

$$(\Delta n) = R/d$$

wherein R represents retardation and d the thickness of the film.

(10) Orientation of biaxially oriented film

The refractive indexes $n_\alpha$, $n_\gamma$ and $n_\beta$ in three directions with respect to the Na - D line was obtained at 25° C. by means of an Abbe refractometer produced by Atago Co., wherein $n_\alpha$ is the refractive index in the direction of thickness, $n_\gamma$ is that in the direction of the main orientation, and $n_\beta$ is that in the direction perpendicular to the main orientation. From these values the degree of surface orientation ($\Delta p$) was obtained as follows.

$$\Delta p = \tfrac{1}{2}(n_\gamma + n_\beta) - n_\alpha$$

Examples 1 to 6 and Comparative Examples 1 to 4

[Preparation of Polyester]

100 parts by weight of dimethyl terephthalate, 70 parts by weight of ethylene glycol, 0.20 part by weight of lithium acetate dihydrate and 0.10 part by weight of calcium acetate monohydrate were charged into a reactor and heated to carry out ester exchange reaction, while distilling off methanol. The reaction temperature was gradually raised until the temperatue reached 230° C. after 4 hours, when the ester exchange reaction was substantially completed. Thereafter, 0.23 part by weight of triethyl phosphate and 0.03 part by weight of phosphoric acid were added to the reaction mixture.

After adding 0.04 part by weight of antimony trioxide to the mixture as a polycondensation catalyst, polycondensation was carried out by an ordinary method. More precisely, after antimony trioxide was added, the temperature was gradually raised and the pressure was gradually reduced, until the temperature reached 280° C. and the pressure 15 mmHg after 100 minutes. The pressure was further reduced until it finally reached 0.3 mmHg. After a predetermined time, the pressure in the system was restored to ordinary pressure to obtain a polyethylene terephthalate (polyester A). By varying the condensation time, polyesters A having various intrinsic viscosities were obtained.

On the other hand, 100 parts by weight of dimethyl terephthalate, 60 parts by weight of ethylene glycol and 0.09 part by weight of magnesium acetate tetrahydrate were charged into a reactor and heated to carry out ester exchange reaction, while distilling off methanol. The reaction temperature was gradually raised until the temperature reached 230° C. after 4 hours, when the ester exchange reaction was substantially completed. Thereafter, an appropriate amount of inactive additional particles having various average particle diameters were added and, further, 0.04 part by weight of ethyl acid phosphate and 0.04 part by weight of antimony trioxide were added to the reaction mixture and carried out polycondensation for 4 hours, thereby obtaining a polyethylene terephthalate (polyester B) having an intrinsic viscosity of 0.63.

A predetermined higher aliphatic monocarboxylic acid sodium was dry blended with polyester A and polyester B by using a biaxial extruder to obtain master batches having a high concentration.

Materials for producing a film having different viscosities, contents of higher monocrboxylic acid sodium, kinds of particles, etc. were obtained by blending these polyesters A, polyesters B and master batches in appropriate ratios.

[Production of Film]

Each of the above-described materials of various kinds was dried by an ordinary method, extruded at 285° C. by an extruder, and was formed into an amorphous film by rapidly cooling by an electrostatic contact method.

The thus-obtained amorphous films were stretched in the machine direction in one stage or multiple stages to obtain films having various double refractive indexes ($\Delta n$). The thus-obtained films were stretched by 4 times by a tenter and were heat set at 230° C. At the time of heatsetting, they were subjected to relaxation in the transverse direction by varying the relaxation ratio in the range of 0 to 10%.

[Production of Magnetic Recording Medium]

|  | Part by weight |
| --- | --- |
| Ferromagnetic powder (Co-doped $\gamma$-$Fe_2O_3$) | 300 |
| Cellulose acetate butylate | 30 |
| Epoxy resin | 25 |
| Silicone oil | 4 |
| Lecithin | 5 |
| Toluene (solvent) | 200 |
| Methyl ethyl ketone (solvent) | 200 |
| Ethyl acetate (solvent) | 100 |

A composition consisting of the above-described components was put into a ball mill and thoroughly kneaded. 180 parts by weight of polyisocyanate compound (Desmodur L-75) was added thereto and the mixture was agitated for 30 minutes. The mixture was applied to one side of the above-described polyethylene terephthalate film to a thickness of 3 μm in the dry state with a gravure roll and dried while applying a magnetic field. After the thus-coated film was subjected to hardening treatment and planishing treatment, the film was slit to a width of ½ inch to obtain a video tape.

The physical properties and the characteristics of the thus-obtained oriented polyester films and the magnetic tapes obtained therefrom are shown in Table 1.

From Table 1, it is clear that the polyester film having a low surface roughness according to the present invention can be used as the base film for a high-quality and high-density recording medium without a back coat layer. Thus, a magnetic recording medium according to the present invention has an industrially high value.

TABLE 1

| | Composition (part by weight with respect to 100 parts by weight of polyester) | | | | | | | File producing condition | |
| --- | --- | --- | --- | --- | --- | --- | --- | --- | --- |
| | Particles | | | | | Higher Aliphatic Compound | | Double refractive index ($\Delta n$) after stretching in the machine direction | Relaxation rate (%) at the time of heat-setting |
| | Inner Particles | | Small particles | | Large particles | | | | |
| | Amount | Diameter (μm) | Kind | Amount | Kind | Amount | Kind | Amount | | |
| Ex. 1 | 0.30 | 0.8 | — | — | — | — | Compound (II) | 0.20 | 0.105 | 0 |
| Ex. 2 | 0.30 | 0.8 | — | — | — | — | Compound (III) | 0.20 | 0.105 | 0 |
| Ex. 3 | 0.30 | 0.8 | — | — | — | — | Compound (I) | 0.20 | 0.105 | 0 |
| Ex. 4 | 0.30 | 0.8 | — | — | — | — | Compound (I) | 0.20 | 0.060 | 10 |
| Ex. 5 | — | — | Synthetic Calcium Carbonate 0.40μ | 0.40 | Synthetic Calcium Carbonate 0.6μ | 0.03 | Compound (I) | 0.20 | 0.060 | 10 |
| Ex. 6 | — | — | Titanium Oxide 0.30μ | 0.40 | Synthetic Calcium Carbonate 0.6μ | 0.03 | Compound (I) | 0.20 | 0.060 | 10 |
| Ex. 7 | — | — | Silica 0.40μ | 0.40 | Synthetic Calcium Carbonate 0.6μ | 0.03 | Compound (I) | 0.20 | 0.060 | 10 |
| Comp. 1 | 0.30 | 0.8 | — | — | — | — | — | — | 0.105 | 0 |
| Comp. 2 | 0.30 | 0.8 | — | — | — | — | — | — | 0.060 | 10 |

TABLE 1-continued

| | Oriented Polyester Film | | | | | | Coefficient of film-film friction | | $\mu_{max}$ during 50-time repeated travelling | | Characteristics of magnetic tape | | | |
|---|---|---|---|---|---|---|---|---|---|---|---|---|---|---|
| | Intrinsic viscosity $[n]_F$ | Double refractive index $\Delta n$ | $\bar{n}$ | Degree of surface orientation $\Delta p$ | A (number/ mm$^2$) | Surface roughness Ra ($\mu$m) | Dynamic ($\mu_d$) | Static ($\mu_s$) | | Wear resistance | Adhesive strength | Travelling nature | Scuff resistance | Electromagnetic conversion property |
| Ex. 1 | 0.58 | 0.006 | 1.6035 | 0.171 | 0 | 0.011 | 0.26 | 0.28 | 0.29 | ⊙ | 1.0 | good | 1 to 2 | good |
| Ex. 2 | 0.58 | 0.006 | 1.6035 | 0.171 | 0 | 0.011 | 0.24 | 0.26 | 0.27 | ⊙ | 1.0 | good | 1 to 2 | good |
| Ex. 3 | 0.58 | 0.006 | 1.6035 | 0.171 | 0 | 0.011 | 0.22 | 0.24 | 0.25 | ⊙ | 1.0 | good | 1 to 2 | good |
| Ex. 4 | 0.58 | 0.015 | 1.6035 | 0.161 | 900 | 0.011 | 0.20 | 0.22 | 0.23 | ⊙ | 1.5 | good | 1 to 2 | good |
| Ex. 5 | 0.58 | 0.015 | 1.6035 | 0.161 | 1200 | 0.011 | 0.20 | 0.21 | 0.21 | ⊙ | 1.5 | very good | 1 | good |
| Ex. 6 | 0.58 | 0.015 | 1.6035 | 0.161 | 700 | 0.011 | 0.20 | 0.21 | 0.21 | ⊙ | 1.5 | very good | 1 | good |
| Ex. 7 | 0.58 | 0.015 | 1.6035 | 0.161 | 2000 | 0.011 | 0.20 | 0.21 | 0.21 | ⊙ | 1.5 | very good | 1 | good |
| Comp. 1 | 0.58 | 0.006 | 1.6035 | 0.171 | 0 | 0.011 | 0.42 | 0.47 | 0.48 | × | 1.0 | bad | 3 | do not run unmeasurable |
| Comp. 2 | 0.58 | 0.015 | 1.6033 | 0.161 | 900 | 0.011 | 0.32 | 0.40 | 0.42 | × | 1.5 | bad | 3 | do not run unmeasurable |

In Table 1, compounds (I), (II) and (III) have the following structures.

Compound (I) a mixture of compounds having the following formula:

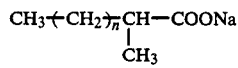

wherein $31 \leq n \leq 39$, and a melting points of 100° to 110° C.

Compound (II) a mixture of compounds having the following formula:

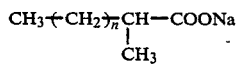

wherein $15 \leq n \leq 34$, containing 30 wt % of the compounds in which $30 \leq n \leq 34$, and having a melting point of 100° to 150° C.

Compound (III) a mixture of compounds having the following formula:

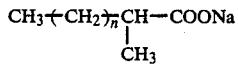

wherein $23 \leq n \leq b\ 39$, containing 51 wt % of the compounds in which $30 \leq n \leq 39$, and having a melting point of 100° to 130° C.

What is claimed is:

1. A magnetic recording medium comprising a biaxially oriented polyester film showing the average surface roughness Ra of 0.005 to 0.013 $\mu$m, the static coefficient ($\mu_s$) of film-film friction of not more than 0.28, the dynamic coefficient ($\mu_d$) of film-film friction of not more than 0.28, and the maximum coefficient of friction of not more than 0.30 during 50-time repeated travelling, said biaxially oriented polyester film containing, with respect to 100 parts by weight of polyester, (A) 0.001 to 1.0 part by weight of inner particles having an average diameter of 0.1 to 1.5 $\mu$m, or inactive additional particles having an average diameter of 0.1 to 1.0 $\mu$m, or a mixture of said inner articles and said inactive additional particles, and (B) 0.005 to 2 parts by weight of an organic lubricant which comprises a mxiture of higher aliphatic monocarboxylic acids haing respectively different carbon numbers of not less than 18, or derivatives thereof having respectively different carbon numbers of not less than 18, or a mixture of said higher aliphatic monocarboxylic acids and said derivatives thereof, said organic lubricant containing not less than 10 wt % of higher alphatic monocarboxylic acid(s) having not less than 34 Carbon atoms, or derivative (s) thereof in which the acid moiety has not less than 34 carbon atoms, or mixtures of said higher alphatic monocarboxylic acid (s) having not less than 34 carbon atoms and said derivative(s) thereof in which the acid moiety has not less than 34 carbon atoms, and has a melting point of 80° to 200° C., said higher aliphatic monocarboxylic acids and derivatives thereof being represented by formula (1):

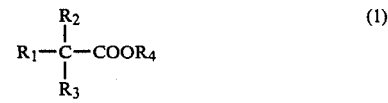

wherein $R_1$ represents an alakyl group or an unsaturated hydrocarbon group having not less than 10 carbon atoms, $R_2$ represents an alkyl group or an unsaturated hydrocarbon group having not less than 2 carbon atoms, $R_3$ represents a hydrogen atom, an alkyl group, or an unsaturated hydrocarbon group having not less than 2 carbon atoms, and R4 represents a hydrogen atom, a metal, an alkyl group or an unsaturated hydrocarbon group having not less than two carbon atoms, the total number of carbon atoms in $R_1$, $R_2$, $R_3$ and $R_4$ being not less than 16; and a magnetic layer provided on one side of said polyester film.

2. A magnetic recording medium according to claim 1, wherein said organic lubriant contains not less tahn 20 wt % of higher aliphatic monocarboxylic acid(s) having not lss than 34 carbon atoms, or dervative (s) thereof in which the acid moiety has not less than 34 carbon atoms, or a mixture of said higher aliphatic monocarboxylic acid (s) having not less than 34 carbon atoms and said derivatives thereof in which the acid moiety has not less than 34 carbon atoms.

3. A magnetic recording medium according to claim 1, wherein said biaxially oriented polyester film satisfies the following relationships (2), (3) and (4):

$$1.600 \leq \bar{n} \leq 1.606 \quad (2)$$

$$\Delta p \leq 1.43 \bar{n} - 2.128 \quad (3)$$

$$\Delta n \leq 20 \times 10^{-3} \quad (4)$$

wherein $\bar{n}$ represents an average refractive index, $\Delta p$ represents a degree of surface orientation, and $\Delta n$ represents a double refractive index.

4. A magnetic recording medium according to claim 1, wherein the number A of pair of protuberances and depression, which is derived from said protuberances and has a major axis of at least 2 $\mu$m, per one mm² of the surface of said biaxially oriented polyester film satisfies the following relationship (5):

$$5 \leq A \quad (5).$$

5. A magnetic recording medium according to claim 1, wherein said biaxially oriented polyester film contains 0.1 to 1.0 part by weight of small-diameter inner particles having an average diameter of 011 to 0.6 $\mu$m and 0 to 0.1 part by weight of large-diameter inactive additional particles havign an average diameter of 0.4 to 1.0 $\mu$m with respect to 100 parts by weight of polyester.

6. A process for producing a magnetic recording medium comprising the steps of mixing a polyester polymer containing 0.001 to 1.0 part by weight of inner particles having an average diameter of 0.1 to 1.5 $\mu$m, or inactive additional particles having an average diameter of 0.1 to 1.0 $\mu$m, or a mixture of said inner particles and said additional particles, with respect to 100 parts by weight of polyester, with 0.005 to 2 parts by weight, with respect to 100 parts by weight of polyester, an organic lubricant which comprises a mixture of higher aliphatic monocarboxylic acids having respectively different carbon numbers of not less than 18, or derivatives thereof having respectively different carbon numbers of not less than 18, or a mixture of said higher aliphatic monocarboxylic acids and said dervatives thereof, said organic lubricant containing not less than 10 wt % of higher aliphatic monocarboxylic acid (s) having not less than 34 carbon atoms, or derivative (s) thereof in which the acid moiety has not less than 34 carbon atoms, or mixtures of said higher aliphatic monocarboxylic acid (s) having not less than 34 carbon atoms and said derivative(s) thereof in which the acid moiety has not less than 34 carbon atoms, and has a melting point of 80° to 200° C., said higher aliphatic monocarboxylic acids and derivative thereof being represented by formula (1):

$$R_1-\underset{\underset{R_3}{|}}{\overset{\overset{R_2}{|}}{C}}-COOR_4 \quad (1)$$

wherein $R_1$ represents an alkyl group or an unsaturated hydrocarbon group having not less than 10 carbon atoms, $R_2$ represents an alkyl group or an unsaturated hydrocarbon group having not less than 2 carbon atoms, $R_3$ represents a hydrogen atom, an alkyl group, or an unsaturated hydrocarbon group having not less than 2 carbon atoms, and $R_4$ represents a hydrogen atom, a metal, an alkyl group or an unsaturated hydrocarbon group having not less than two carbon atoms, the total number of carbon atoms in $R_1$, $R_2$, $R_3$ and $R_4$ being not less than 16;

melt extruding the mixture at a temperature of 250° to 310° C. into an amorphous film;

stretching the amorphous film in the machine direction by 2.0 to 8.0 times at a temperature of 75° to 140° C. so that the double refractive index after stretching is 0.030 to 0.130;

stretching the thus obtained film in the transverse direction by 2.0 to 5.0 times at a temperature of 90° to 150° C.;

heat setting the thus biaxially stretched film at a temperature of 200° to 240° C. for 1 to 60 seconds, thereby obtaining a biaxially oriented polyester film showing the average surface roughness Ra of 0.005 to 0.013 $\mu$m, the static coefficient ($\mu_s$) of film-film friction of not more than 0.28, the dynamic coefficient ($\mu_d$) of film-film friction of not more than 0.28, and the maximum coefficient friction of not more than 0.30 during 50-time repeated travelling; and forming a magnetic layer on one side of said biaxially oriented polyester film.

7. A magnetic recording medium according to claim 1, wherein said organic lubricant contains not less than 20 wt. % of higher aliphatic monocarboxylic acid(S) in which the acid moiety has not less than 34 carbon atoms or derivative (s) thereof in which the acid moiety has not less than 34 carbon atoms, or a mixture of said higher aliphatic monocarboxylic acid (s) having not less than 35 carbon atoms and said derivatives thereof in which the acid moiety has not less than 34 carbon atoms; and wherein said biaxially oriented polyester film satisfies the following relationships (2), (3) and (4):

$$1.600 \leq \bar{n} \leq 1.606 \quad (2)$$

$$\Delta p \leq 1.43 \bar{n} - 2.128 \quad (3)$$

$$\Delta n \leq 20 \times 10^{-3} \quad (4)$$

wherein $\bar{n}$ represents an average refractive index, $\Delta p$ represents a degree of surface orientation, and $\Delta n$ represents a double refractive index; and wherein the number A of pair of protuberances and depression, which is derived from said protuberances and has a major axis of at least 2 $\mu$m, per one mm² of the surface of said biaxially oriented polyester film satisfies the following relationsip (5):

8. A magnetic recording mediium according to claim 7, wherein said organic lubricant consists substantially of higher aliphatic monocarboxylic acid (s) having not less than 34 carbon atoms, derivative (s) thereof in which the moiety has not less than 34 carbon atoms, or a mixture of said higher aliphatic monocarboyxlic acid (s) having not less than 34 carbon atoms and said derivatives thereof in which the acid moiety has not less than 34 carbon atoms.

9. A magnetic recording medium according to claim 7, wherein said organic lubricant contains not less than 30 wt. % of higher apliphatic monoarboxylic acid(s) having not less than 34 carbon atoms, or dervative(s) thereof in which the acid moiety has not less than 34 carbon atoms, or a mixture of said higher aliphatic monocarboxylic acid(s) having not less than 34 carbon atoms and said derivatives thereof in which the acid moiety has not less than 34 carbon atoms.

10. A process according to claim 6, wherein said organic lubricant contains not less than 20 wt. % of higher aliphatic monocarboxylic acid(s) having not less than 34 carbon atoms, or derivative(s) thereof in which the acid moiety has not less than 34 carbon atoms, or a mixture of said higher alphatic monocarboxylic acid(s) having not less than 34 carbon atoms and said derivatives thereof in which the acid moiety has not less than 34 carbon atoms.

11. A process according to claim 6, wherein said organic lubricant contains not less than 30 wt. % of higher aliphatic monocarboxylic acid(s) having not less than 34 carbon atoms or derivative(s) thereof in which the acid moiety has not less than 34 carbon atoms or a mixture of said higher aliphatic monocarboxylic acid(s) having not less than 34 carbon atoms and said derivatives thereof in which the acid moiety has not less than 34 carbon atoms.

12. A process according to claim 6, wherein said organic lubricant consists substantially of higher aliphatic monocarboxylic acid(s) having not less than 34 carbon atoms, or derivative(s) thereof in which the acid moiety has not less than 34 carbon atoms, or a mixture of said higher aliphatic monocarboxylic acid(s) having not less than 34 carbon atoms and said derivatives thereof in which the acid moiety has not less than 34 carbon atoms.

* * * * *